United States Patent [19]

Mendez

[11] Patent Number: 5,614,238
[45] Date of Patent: Mar. 25, 1997

[54] PROCESS FOR THE NATURAL ASEPTIC PACKAGING OF JUICES FOR EXTENDING SHELF LIFE WITHOUT REFRIGERATION

[76] Inventor: Alejandro Mendez, 8260 NW. 58 St., Miami, Fla. 33166

[21] Appl. No.: 442,188

[22] Filed: May 16, 1995

[51] Int. Cl.$^6$ .................................................. A23B 7/005
[52] U.S. Cl. .................. 426/397; 426/399; 426/401; 426/403; 426/407; 426/416; 426/521; 426/599; 426/615
[58] Field of Search .................................. 426/521, 397, 426/399, 401, 403, 407, 416, 615, 599

[56] References Cited

U.S. PATENT DOCUMENTS 4,441,406  4/1984  Becker et al. ........................... 426/521

OTHER PUBLICATIONS

Rombauer et al. 1975, Joy of Cooking, the Bobbs–Merrill Co., N.Y., pp. 803, 805.

Primary Examiner—Helen Pratt
Attorney, Agent, or Firm—Malin, Haley, DiMaggio & Crosby

[57] ABSTRACT

A process that kills, or renders organically inactive, one hundred percent of the bacteria and enzymes, as well as any other non-pathogenic microorganisms present in fresh squeezed citrus and non-citrus fruit juices and fruit juice blends, as well as fruit pulps. The process results in the aseptic packaging of one hundred percent natural juices having a shelf life extending from two to three years without the need for refrigeration, and without the use of artificial preservatives or additives. The process also preserves the natural taste, colors, and odors typically found in fresh squeezed juices and juice blends, an citrus pulp.

6 Claims, 4 Drawing Sheets

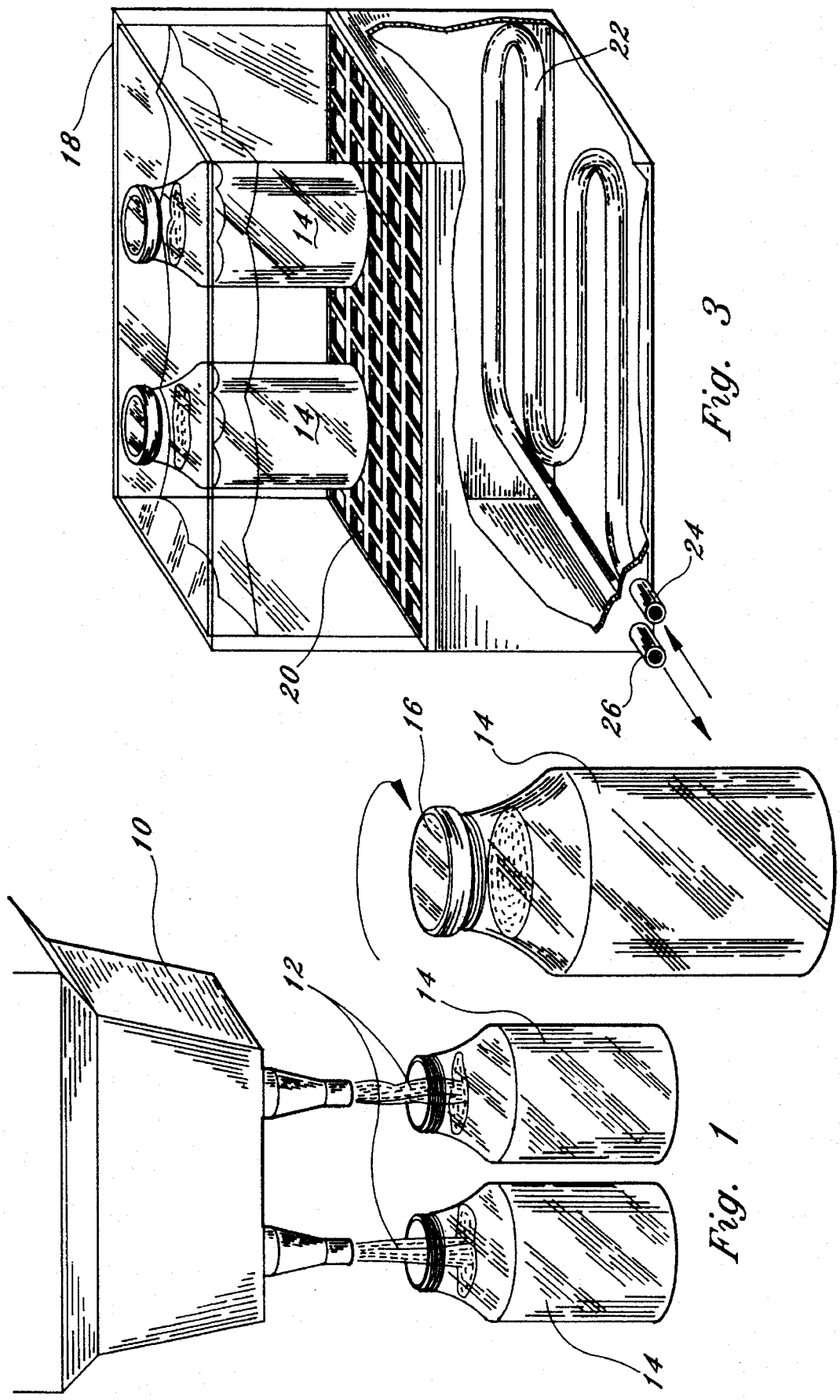

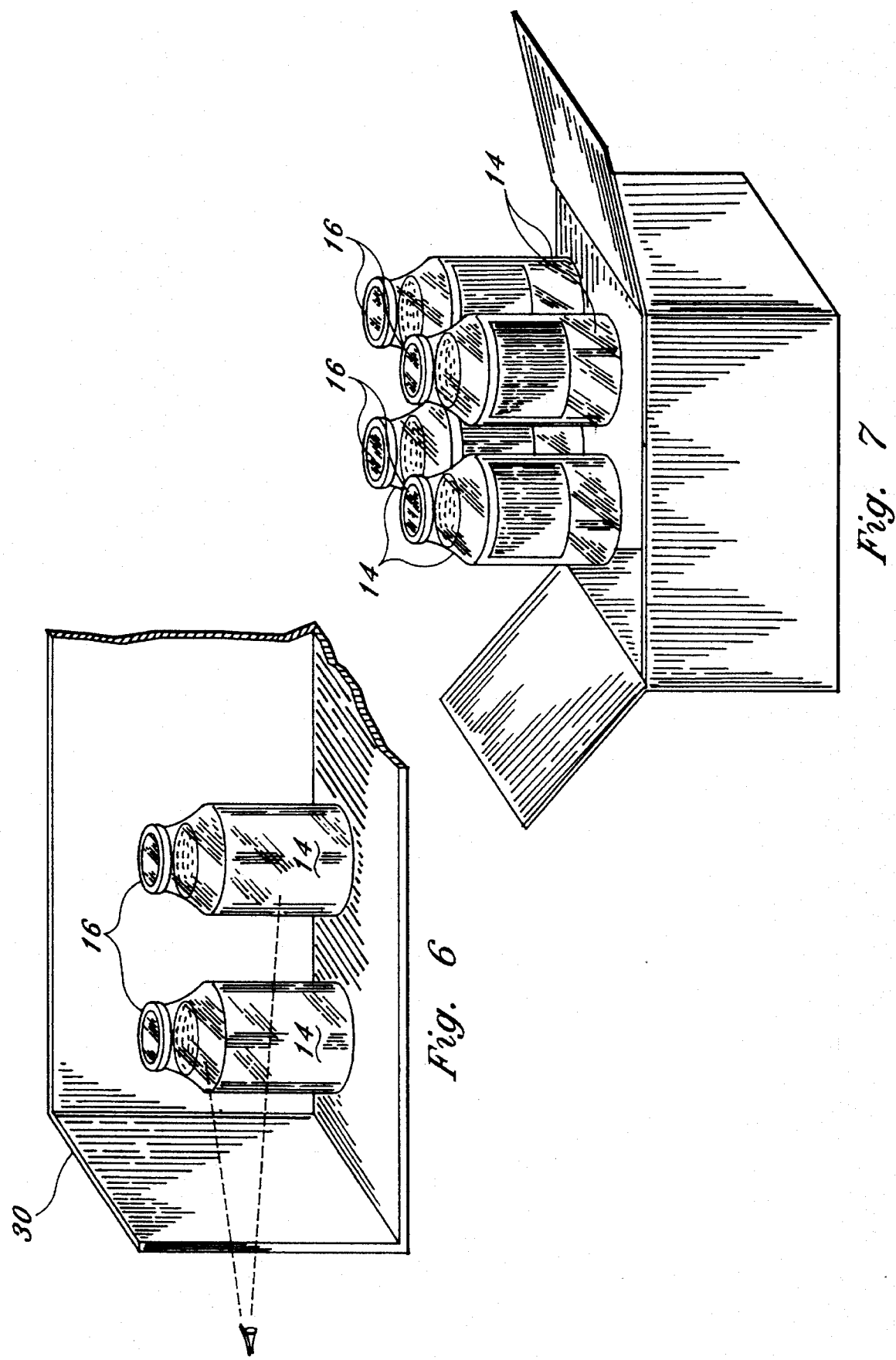

PROCESS FOR THE NATURAL ASEPTIC PACKAGING OF JUICES FOR EXTENDING SHELF LIFE WITHOUT REFRIGERATION

BACKGROUND OF THE INVENTION

1. Field of the Invention

The present invention is directed to a method for preserving fresh squeezed citrus and non-citrus fruit juices and fruit juice blends and fruit pulps, and more particularly is directed to a thermal preserving method for aseptically packaging 100% pure fruit juices, juice blends, and fruit pulps, such that the packaged product has an extended shelf life of up to three years without refrigeration.

2. Description of the Prior Art

When fruits are harvested, microbiological and chemical changes occur which limit the time the fruit remains acceptable to the consumer and is safe for consumption. Since most of the post-harvest changes in food lead to spoilage, various methods of food preservation are used to prolong the length of time for which the food, and especially fruit juices, retain quality and appeal.

In the days of simple farming communities, it was possible to live on locally grown fruits and vegetables and no highly organized methods of food preservation were necessary. In the modern world however, centers of world population are in towns and cities, often many miles from the main areas of food production. Thus, unless preserved, food deteriorates prior to reaching the consumer.

After harvesting, plant tissue is unable to prevent the attack of microorganisms such as bacteria, yeast, and molds, which break down the food structure and produce undesirable "off-flavors," discoloration, and odors. The number of organisms in an ounce of food can range from several hundred to twenty million or more and the organisms are capable of rapid multiplication, such that under certain conditions, their numbers can double every fifteen or twenty minutes.

Bacteria are minute microorganisms that are the most common cause of food spoilage. Generally, bacteria will either cause food spoilage, rendering the food unpleasant to eat, or in the case of pathogenic bacteria, such as *Staphylococcus aureus* or *Clostridium botulinum*, it will have far worse effects giving rise to food poisoning.

Food spoilage may also be caused by chemical substances known as enzymes which are always present in minute quantities in living materials. In fruit, enzymes are chemical catalysts which bring about the change of flavor and texture associated with ripening. Enzymes are also often responsible for the deterioration of fruits after harvesting, such as the browning of the cut surface of apples and pears caused by the oxidation of phenols in the enzyme phenolase. Enzymes can be rendered organically inactive by exposure to heat.

Thermal preservation techniques for rendering inactive bacteria and enzymes in fruit juices and citrus pulp typically rely on known, large scale, pasteurization techniques. Pasteurization is a mild heat treatment process, wherein a supply of food product is heated in stainless steel containers at temperatures normally less than 212° F. (100° C.). Although common pasteurization techniques destroy pathogenic organisms, they do not provide indefinite protection against microbiological spoilage.

Even an acidic product, such as fruit juice, requires protection from spoilage organisms such as acetobacter, whose growth can lead to cloudiness in the fruit juice product. Cloudiness in some citrus juice products is due to the presence of pectin, which occurs naturally in the fruit. If the natural pectolytic enzymes of the fruit are not destroyed, they degrade the pectin with the result that the juice becomes cloudy and often gels. Therefore, in order to destroy the pectolytic enzymes, most citrus juices are processed by flash pasteurizing in a plate heat exchanger at 203° F. (95° C.) for 30 seconds. However, while partially rendering enzymes organically inactive, this process degrades juice quality since the juice in contact with metallic heat exchanger elements is vastly overheated. Furthermore, the prior art methods have been found unsatisfactory for rendering the enzymes present in citrus and non-citrus fruit juices organically inactive or destroying bacteria and other pathogenic and non-pathogenic organisms.

As a result, certain fruit juices have not been made readily available to the consuming public due to the limited success of the prior art methods. For example, juices such as banana juice and pineapple juice are not found on store shelves packaged in a one hundred percent natural state. Oftentimes, the juice quality is compromised by the addition of various preservatives to maintain freshness and color.

Thus, there still exists a need for a thermal preservation process specifically designed for citrus and non-citrus fruit juices and fruit juice blends, as well as citrus pulp, that provides aseptic packaging of these products in a one hundred percent natural state and results in an extended shelf life of up to three years without the need for refrigeration.

SUMMARY OF THE INVENTION

The instant invention teaches a process that kills, or renders organically inactive, one hundred percent of the bacteria and enzymes, as well as any other non-pathogenic microorganisms present in fresh squeezed citrus and non-citrus fruit juices and fruit juice blends, as well as fruit pulps. The process results in the aseptic packaging of one hundred percent natural juices having a shelf life extending from two to three years without the need for refrigeration, and without the use of artificial preservatives or additives. The process also preserves the natural taste, colors, and odors typically found in fresh squeezed juices and juice blends, an fruit pulp.

The process includes: extracting the juice or pulp in a conventional manner using a juice extractor; immediately bottling the extracted juice or pulp into temperature-resistant containers capable of withstanding temperatures up to 100° C.; partially capping the containers with a suitable commercial pop-up cap; substantially submerging the containers in a water bath having a temperature of 80° C.; raising the temperature of the water in the tank to 100° C.; monitoring the juice temperature until the juice reaches 92° C. (stirring as necessary); immediately removing the containers from the water bath once the juice temperature reaches 92° C.; completing the capping procedure such that the individual juice containers are sealed in an airtight manner; immediately cooling down the individual containers with a rinse of water at room temperature, thereby causing a vapor lock inside the individual bottles caused by the volumetric contraction of the enclosed vapor during cooling, and also preventing overheating; allowing the juice inside the containers to cool down to approximately 35° C.; allowing the processed juice to stabilize for three days during which quality control checks detect any fermentation, contamination, leaks, or other defects with the vapor lock that has been created; and labeling, boxing, and shipping the containers for consumption.

Therefore it is an object of the instant invention to provide a thermal preservation method for citrus and non-citrus fruit juices, fruit juice blends, and fruit pulps, whereby 100 percent natural juice or pulp products may be aseptically packaged in air tight containers having an extended, non-refrigerated, shelf life of at least two years.

It is a further object of the instant invention to provide a thermal preservation method whereby juice and pulp products are prevented from overheating contact with heat exchanging apparatus.

Yet another object of the instant invention is to provide a thermal preservation process whereby juice and fruit pulp products are packaged prior to exposure to raised temperatures.

Still another object of the present invention is to provide a thermal preservation process whereby pre-packaged juice or pulp vents container vapor during the heating process and creates a vapor lock during the cooling process.

In accordance with these and other objects which will become apparent hereinafter, the instant invention will now be described with particular reference to the accompanying drawings.

BRIEF DESCRIPTION OF THE DRAWINGS

FIG. 1 illustrates the container filling procedure.

FIG. 2 illustrates partially capping the containers.

FIG. 3 illustrates the containers lowered into a water bath and the heating procedure wherein the water temperature is raised.

FIG. 6 illustrates the containers during the stabilization and inspection stage.

FIG. 7 illustrates the final labeling and packaging stage.

DESCRIPTION OF THE PREFERRED EMBODIMENTS

A process that kills, or renders organically inactive, one hundred percent of the bacteria and enzymes, as well as any other non-pathogenic microorganisms present in fresh squeezed citrus and non-citrus fruit juices and fruit juice blends, as well as fruit pulps. The process results in the aseptic packaging of one hundred percent natural juices having a shelf life extending from two to three years without the need for refrigeration, and without the use of artificial preservatives or additives. The process also preserves the natural taste, colors, and odors typically found in fresh squeezed juices and juice blends, an fruit pulp.

Figure 8:
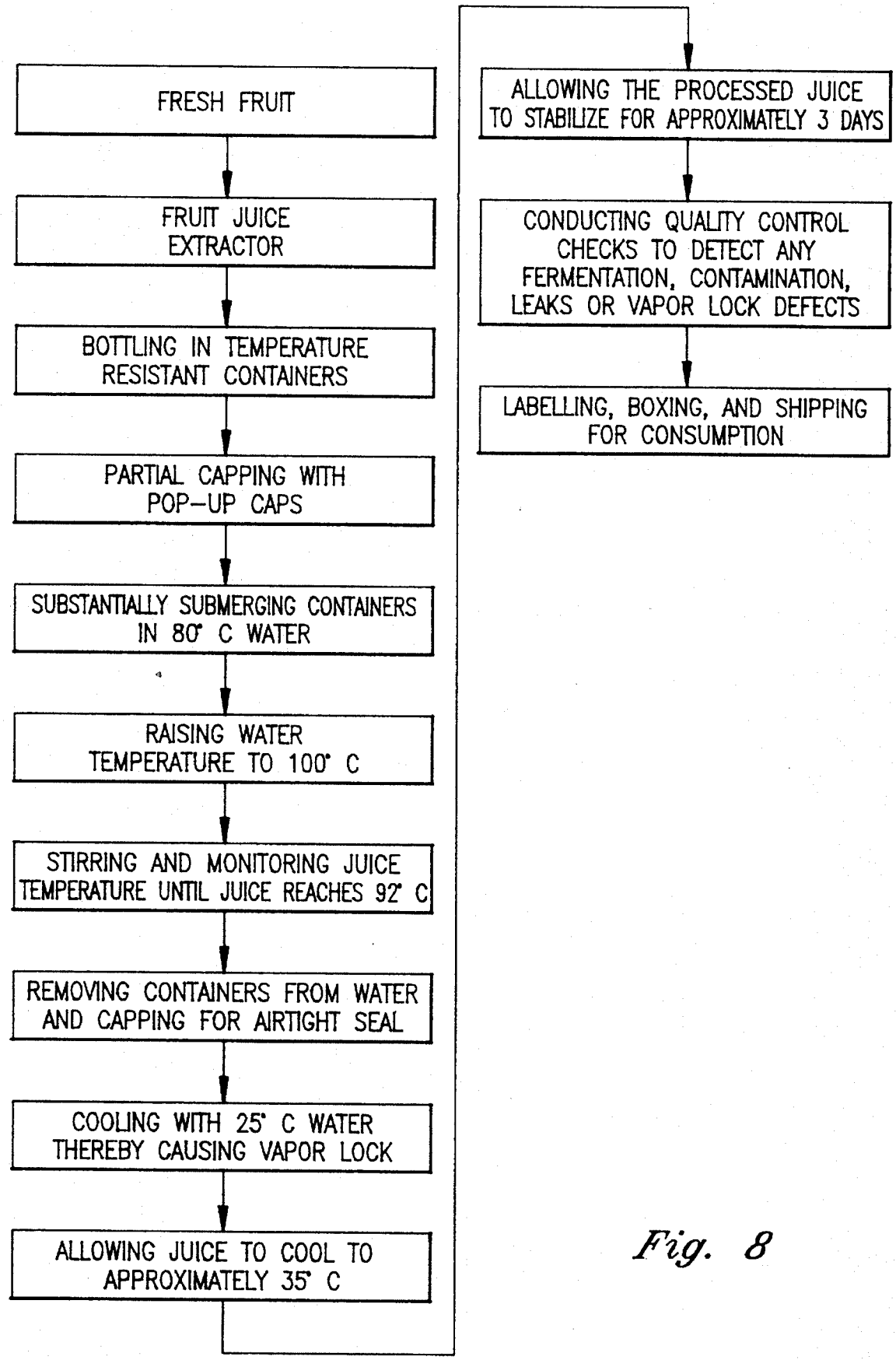
FIG. 8 is a flow chart of the instant process.

FIG. 8 is a flow chart of the process taught by the instant invention. The process includes the following steps. Extracting the juice or pulp using an appropriate extracting device as illustrated in FIG. 1. For example, a citrus juice extractor 10 may be utilized to extract juice and pulp from citrus including oranges, tangerines, and grapefruit. On the other hand, fruit, such as bananas, may require more specialized extracting devices. Regardless of the extraction method, 100 percent natural juice or pulp, shown generally as 12, is obtained.

The extracted juice, juice blend, or fruit pulp (hereinafter "product") is immediately bottled in temperature-resistant containers 14 capable of withstanding temperatures up to 100° C. In the preferred embodiment glass containers are used. It has been found that glass containers are particularly well suited for use with the instant process since the glass wall acts as a thermal insulator thereby protecting the product from exposure to extreme surface temperatures such as would be experienced by heating the product in a thin wall stainless steel container.

As best seen in FIG. 2, the filled containers 14 are "partially capped" with a suitable commercial pop-up cap 16. The term "partially capped" refers to capping the container by imparting a partial turn to the cap such that the cap is semi-sealed and vapor and gas remaining in the container may escape during expansion.

As best shown in FIG. 3, the containers 14 are then substantially submerged in a tank 18 of water having a temperature of 80° C. It has been found that submerging the container such that the exterior water level reaches approximately ⅔ to ¾ of the container height is optimum. Tank 18 is constructed having an elevated, or double bottom, shown as 20, for elevating the containers above a heat exchanging means 22. In the preferred embodiment, the heat exchanging means includes a steam heat exchanger, having a steam inlet 24 and a steam outlet 26, submerged within tank 18 and supplied by superheated steam.

The temperature of the water in the tank is then raised to 100° C. using by steam heat exchanging means 22. As the temperature of the water in the tank is uniformly raised, temperature sensors (not shown) monitor the product temperature. To insure uniform product temperature rise, the product may be mixed by agitating the containers. The heat transfer process is terminated when the product reaches 92° C. and the product is maintained at that temperature from 5 to 10 minutes, depending on the product, for rendering inactive organic matter such as bacteria and enzymes.

Figure 5:
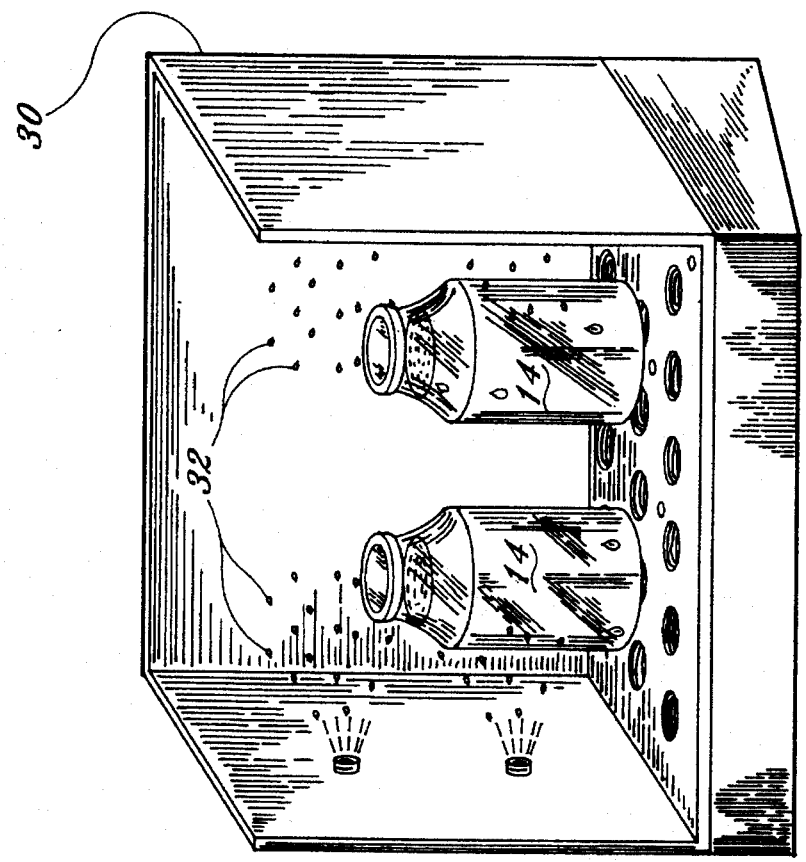
FIG. 5 illustrates cooling the containers with a water spray.
Figure 4:
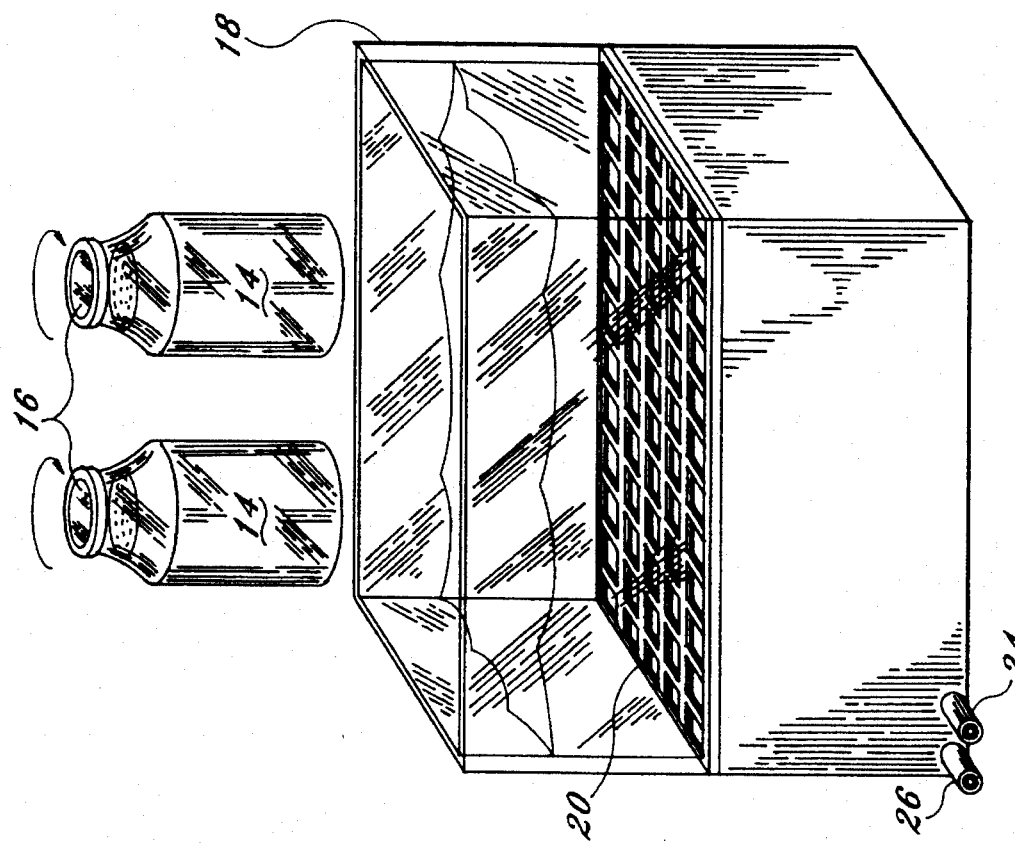
FIG. 4 illustrates the final capping process forming an air tight seal.

The containers are then removed from the tank and "totally capped" as best illustrated in FIG. 4. "Totally capped" is defined as securing the cap in an air tight manner, typically by imparting an additional twist to the cap 16. As best depicted in FIG. 5, the product is then partially cooled on specially designed cooling racks 30, using a spray of water 32 at approximately 25 C., thereby producing cooling induced volumetric contraction of the liquid and vapor in the containers which produces a vapor lock, thereby causing the pop-up portion of the pop-up cap to become depressed (not shown) indicating a positive seal. Once a vapor lock is achieved, the containers are allowed to further cool at ambient conditions to approximately 35° C.

As best illustrated in FIG. 6, the product is then allowed to stabilize for approximately 3 days, during which time the product undergoes quality control inspections to detect any fermentation, contamination, leaks, or defects in the vapor lock seal.

The resulting product is then labeled, boxed and shipped for consumption as illustrated in FIG. 7. Product produced by the instant process has an extended shelf life of over 2 years without refrigeration. In addition, the instant process prevents discoloration resulting from oxidation The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A thermal preservation process for the aseptic packaging of 100 percent natural fruit juice, fruit juice blends, and fruit pulp products resulting in a packaged product having an extended shelf life of up to three years without refrigeration, including the steps of:

extracting a juice or pulp product using a juice extractor;

immediately bottling the extracted product into temperature-resistant containers capable of withstanding temperatures up to 100° C.;

partially capping said containers with a commercial pop-up cap;

substantially submerging the containers in a tank containing a water bath;

raising the temperature of the water in the tank to 100° C.;

monitoring the product temperature and agitating the product until the product reaches 92° C.;

immediately removing the containers from the water bath once the product temperature reaches 92° C.;

completing the capping procedure such that the individual product containers are sealed in an airtight manner;

immediately cooling down the individual containers with a rinse of water at room temperature, thereby causing a vapor lock inside the individual containers caused by the volumetric contraction of the enclosed vapor during cooling, and also preventing overheating;

allowing the product inside the containers to cool down to approximately 35° C.;

allowing the processed product to stabilize for three days during which quality control checks detect any fermentation, contamination, leaks, or other defects with the vapor lock that has been created;

labeling, boxing, and shipping the containers for consumption.

2. A thermal preservation process for the aseptic packaging of 100 percent natural fruit juice and fruit pulp according to claim 1, wherein said product is fruit juice.

3. A thermal preservation process for the aseptic packaging of 100 percent natural fruit juices and fruit pulp according to claim 1, wherein said product is citrus pulp.

4. A thermal preservation process for the aseptic packaging of 100 percent natural fruit juices and fruit pulp according to claim 1, wherein said containers are made of glass.

5. A thermal preservation process for the aseptic packaging of 100 percent natural fruit juices and fruit pulp according to claim 1, wherein steam is used as the primary source of heat.

6. A process for the thermal preservation and aseptic packaging of 100% natural fruit juice, fruit juice blends, and fruit pulp products resulting in a packaged product having an extended shelf life of up to three years without refrigeration, including the steps of:

extracting 100% natural juice or pulp product from fruit;

immediately bottling said extracted product into individual temperature-resistant containers capable of withstanding temperatures of at least 100° C.;

partial capping said containers with a commercial pop-up cap;

exposing said containers to a temperature controlled environment;

raising the temperature of said temperature controlled environment to approximately 100° C.;

monitoring the product temperature until the product reaches approximately 92° C.;

maintaining the product at approximately 92° C. for between 5 and 10 minutes;

removing the containers from the temperature controlled environment;

completing the capping procedure such that the individual product containers are sealed in an airtight manner;

immediately partially cooling down the individual containers with a spray of water;

allowing the product within the containers to cool down to approximately 35° C.;

allowing the processed product to stabilize for at least 24 hours while conducting quality control checks detect any fermentation, contamination, leaks, or other defects.

* * * * *